US009593671B2

(12) United States Patent
Astier et al.

(10) Patent No.: US 9,593,671 B2
(45) Date of Patent: Mar. 14, 2017

(54) WIRELESS TRANSMISSION BETWEEN A MOVABLE PORTION AND A STATIONARY PORTION IN A WINDMILL NACELLE

(71) Applicants: UNIVERSITE DE PICARDIE JULES VERNE, Amiens (FR); MERSEN FRANCE AMIENS SAS, Amiens (FR)

(72) Inventors: Remy Astier, Romans-sur-Isere (FR); Jerome Dubois, Saint Quentin (FR); Thierry Capitaine, Essigny-le-Grand (FR); Aurelien Lorthois, Beaurevoir (FR); Valery Bourny, Amiens (FR); Veronique Da Ros, Boulay (FR)

(73) Assignees: UNIVERSITE DE PICARDIE JULES VERNE, Amiens (FR); MERSEN FRANCE AMIENS SAS, Amiens (FR)

( * ) Notice: Subject to any disclaimer, the term of this patent is extended or adjusted under 35 U.S.C. 154(b) by 0 days.

(21) Appl. No.: 15/038,926

(22) PCT Filed: Nov. 27, 2014

(86) PCT No.: PCT/FR2014/053064
§ 371 (c)(1),
(2) Date: May 24, 2016

(87) PCT Pub. No.: WO2015/079176
PCT Pub. Date: Jun. 4, 2015

(65) Prior Publication Data
US 2016/0377059 A1   Dec. 29, 2016

(30) Foreign Application Priority Data

Nov. 27, 2013   (FR) ..................................... 13 61673

(51) Int. Cl.
*H04B 5/00*   (2006.01)
*F03D 7/04*   (2006.01)
(Continued)

(52) U.S. Cl.
CPC ............. *F03D 7/047* (2013.01); *F03D 80/82* (2016.05); *H04B 7/24* (2013.01); *H04L 65/60* (2013.01);
(Continued)

(58) Field of Classification Search
CPC   F03D 7/047; F03D 80/82; H04B 7/24; H04B 5/0031; H04B 5/02; H04L 65/60;
(Continued)

(56) References Cited

U.S. PATENT DOCUMENTS 8,202,050 B2   6/2012   Caffrey
2004/0151578 A1*   8/2004   Wobben ................. F03D 17/00
415/4.1
(Continued)

OTHER PUBLICATIONS

International Search Report, dated Jan. 19, 2015, from corresponding PCT application.

*Primary Examiner* — Nguyen Vo
(74) *Attorney, Agent, or Firm* — Young & Thompson

(57) ABSTRACT

A system for transmitting signals, including a device for transmitting data between a movable and stationary portion of a windmill, to be installed on either portion, and including: connection elements for connecting at least one wireline to a plurality of groups to receive a plurality of respective data flows, each flow coming from a corresponding apparatus installed on the mobile portion or stationary portion; elements for processing the received streams, configured to assign a priority parameter value to each received stream, and in the event of concomitant reception of multiple streams, to compare the values of the priority parameter that are associated with the received streams and transmit by priority to a module for transceiving the radiofrequency signals, with a view to a radiofrequency transmission to the other of mobile or stationary portion, the stream associated (Continued)

Figure 2:
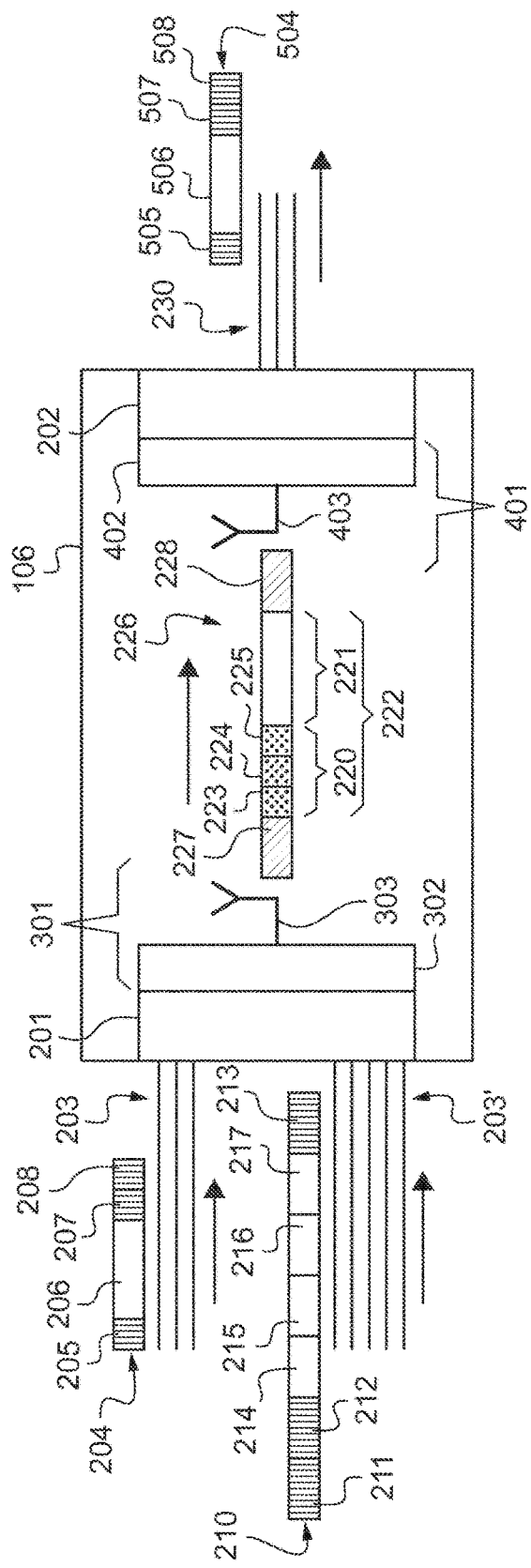

with the value of the priority parameter corresponding to the highest degree of priority.

16 Claims, 2 Drawing Sheets

(51) Int. Cl.
*H04B 7/24* (2006.01)
*H04L 29/06* (2006.01)
*H04W 76/02* (2009.01)

(52) U.S. Cl.
CPC ..... *H04W 76/021* (2013.01); *F05B 2270/504* (2013.01)

(58) Field of Classification Search
CPC .. H04L 5/0064; H04W 76/021; H04W 72/10; H04W 72/1242; H04W 72/1247
See application file for complete search history.

(56) References Cited

U.S. PATENT DOCUMENTS

| | | | |
|---|---|---|---|
| 2009/0160189 A1 | 6/2009 | Rasmussen | |
| 2011/0049887 A1* | 3/2011 | Milo | G05B 19/042 290/44 |
| 2013/0022462 A1* | 1/2013 | Lang | G01D 21/00 416/1 |
| 2014/0260634 A1* | 9/2014 | Newman | F03D 17/00 73/645 |

* cited by examiner

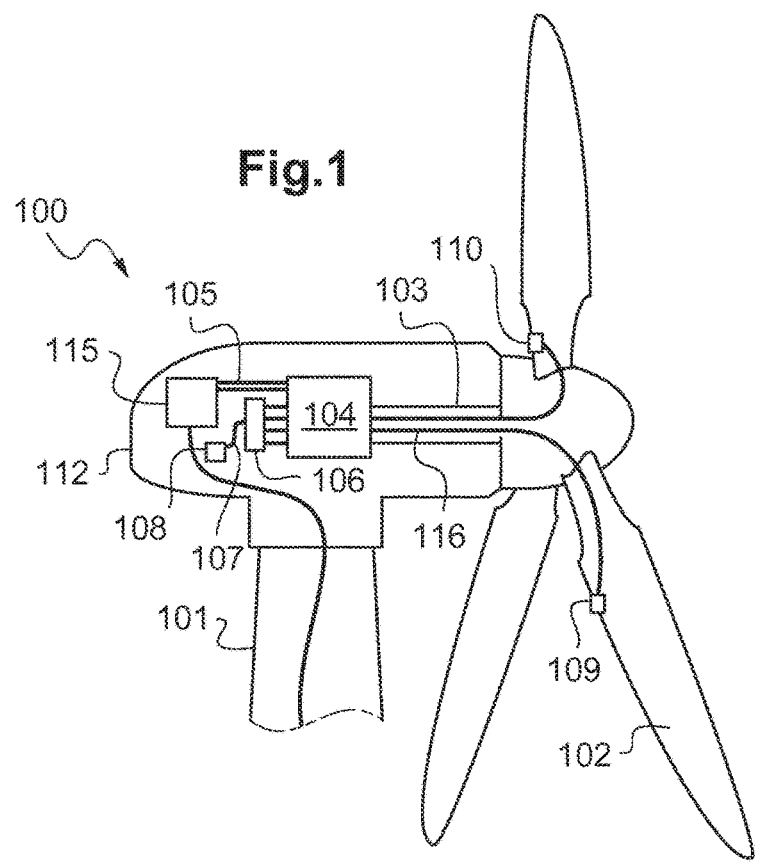
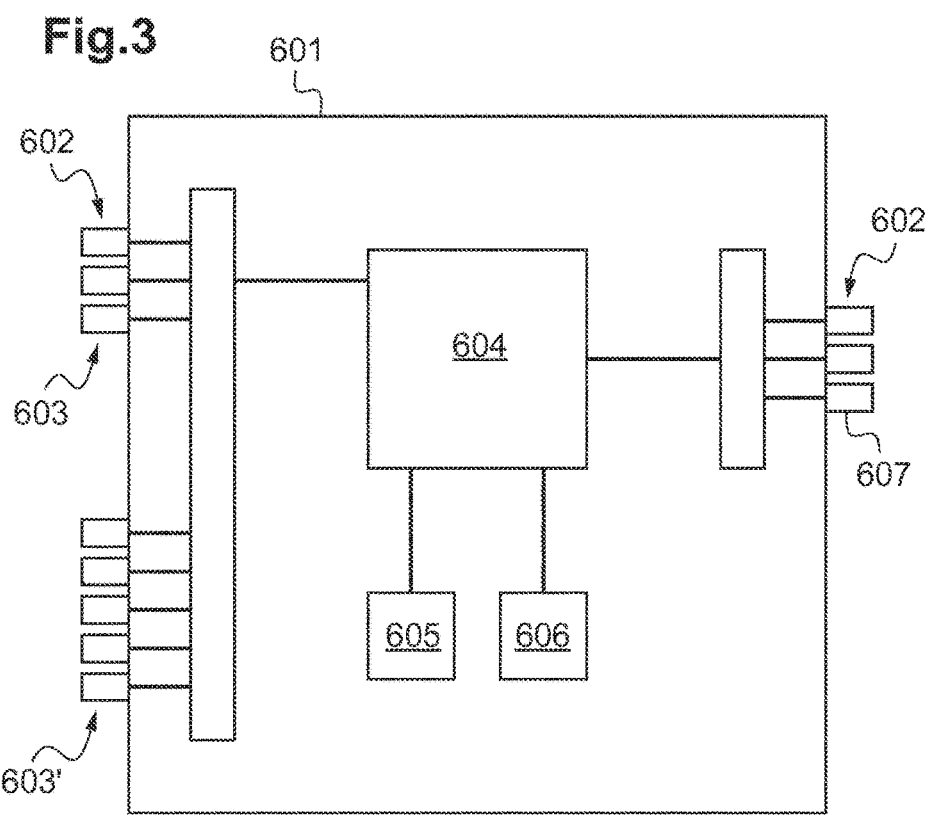

WIRELESS TRANSMISSION BETWEEN A MOVABLE PORTION AND A STATIONARY PORTION IN A WINDMILL NACELLE

The invention relates to the transmission of data between a movable portion and a stationary portion in a wind turbine nacelle.

Conventionally, a system for transmitting signals or STS ("Signal Transfer System") is used, this system comprising a slip ring for transferring data between the stationary portion and the movable portion. The data transfer may in particular take place between sensors installed on a movable portion of the nacelle, for example the nose of the nacelle of the wind turbine, and a supervisor comprising at least one processor in the nacelle or on the ground. For example, measurement data coming from sensors, for example values of the orientation of blades, of their vibration, or other, can be transmitted via this slip ring, to the processor, and inversely control data coming from the processor, for example messages in order to impose an angle of rotation of the blades, or other, can also be transferred via the slip ring.

However a slip ring, as with any electromechanical system involving a sliding contact, is subject to degradations due to wear and tear, temperature variations, presence of dust, vibrations subjected to, etc.

Document U.S. Pat. No. 8,202,050 describes a contactless slip ring device, i.e. integrating wireless means of transmission. This device has relatively few constraints in terms of maintenance.

However, a wind turbine can implement a certain number of data streams between the stationary portion and the movable portion. In particular the wind turbine can comprise a certain number of sensors and actuators.

It has been considered to provide dedicated wireless means of transmission for each wire, but this solution risks being complicated and expensive in terms of bandwidth. One could in particular risk a saturation of the frequency spectrum.

It has also been considered to program each one of the devices of the movable portion and of the stationary portion in such a way that each one of these devices emits data only during predetermined ranges of time.

There is therefore a need for a transmission of data between a movable portion and a stationary portion in a wind turbine nacelle that makes it possible to reconcile easy maintenance, simplicity and low occupation of the bandwidth.

There is provided a device for transmitting data between a movable portion and a stationary portion of a wind turbine, intended to be installed on the movable portion or the stationary portion of the wind turbine, and comprising:
  means for connecting to a plurality of groups of at least one wireline, in order to receive a plurality of respective data streams, each stream coming from a corresponding apparatus installed on the mobile portion or on the stationary portion of the wind turbine,
  means for processing the received streams, configured to assign a priority parameter value to each received stream, and in the event of concomitant reception of multiple streams, to compare the values of the priority parameter that are associated with the received streams and transmit by priority to a module for transceiving the radiofrequency signals, for the purpose of a radiofrequency transmission to the other of the movable portion or the stationary portion of the wind turbine, the stream associated with the value of the priority parameter corresponding to the highest degree of priority.

As such, such a device, able to arbitrate between the streams coming from several different devices, can use less bandwidth than the solution considered, and this while still offering the same comfort in terms of maintenance.

Furthermore this device can make it possible to avoid a programming of the various devices of the movable portion, of the sensor, actuator type, or other, in order to organise the various communications, for example by allocating to each device ranges of time for the transmission and/or reception of data. The device proposed is as such relatively compatible with already existing installations.

There is also provided a system for transmitting data between a movable portion and a stationary portion of a wind turbine, comprising:
  a first interface module intended to be installed on the movable portion or the stationary portion of the wind turbine, and comprising the device described hereinabove,
  a first module for transceiving radiofrequency signals, connected to the first interface module, in order to emit radiofrequency signals using signals received from the first interface module,
  a second module for transceiving radiofrequency signals, intended to be installed on the other of the movable portion or the stationary portion of the wind turbine, for receiving the radiofrequency signals emitted by the first module for transceiving, and
  a second interface module, connected to the second module for transceiving, comprising connection means for transmitting data coming from the second wireless module for transceiving over at least one group of at least one wireline, to at least one device installed on the other mobile portion or on the stationary portion of the wind turbine.

Such an STS system can advantageously replace STS systems with a slip ring of prior art.

Advantageously and in a non-limiting manner, for at least one stream, the priority parameter value assigned to this stream can be a function:
  of a value of a communications protocol identifier corresponding to this stream; the device can as such comprise or be connected to a memory for storing protocol identifiers and priority parameter values, with this memory being structured in such a way as to associate a corresponding value of the priority parameter to at least one protocol identifier,
  of an identifier value of the device of the movable portion corresponding to this group of wireline or wirelines, and/or
  of an identifier value of the device of the stationary portion mentioned in a data destination field received over this wireline.

As such, any data placed on hold and/or not transmitted can for example be data of lesser importance.

A communication channel involves several layers, of which a physical layer, charged with the actual transmission of signals that here are electric, here over a group of wireline or wirelines, and other layers of a higher level. To these layers of a higher level, referred to as protocolary in this application, correspond various protocol parameters, in particular parameters relative to a flow rate, to a modulation, to an error correcting code, a structure of frames, to rules of communication (for example provide the emission of a frame for acknowledgement and another sending in the case of non-reception of the acknowledgement of receipt frame after a given lapse of time), etc.

The invention is not limited by the communication protocols implemented over the wirelines. Men can be made for example of RS232, RS422, RS485, Bus CAN ("Controller Area Network"), Ethernet, ProfiBus ("Process Field Bus"), Modbus, Interbus.

To a given protocol, is associated a group of line(s) comprising a defined number of lines, for example three lines for the protocol RS232, two or four lines for the protocol RS485, two lines for the CAN bus, and five lines for Ethernet.

The device described hereinabove can as such make it possible to arbitrate the streams according to the robustness of the protocol and/or the assumed criticality of the data. For example a stream according to a CAN protocol can be transmitted with a priority that is higher than an Ethernet stream.

This arbitrage can also be according to the importance of the various devices connected to the device. For example, the data coming from a humidity sensor could be transmitted with a lesser degree of priority than the data coming from a blade speed sensor.

Advantageously and in a non-limiting manner, the first interface module and the first module for transceiving radiofrequency signals can be intended for an installation on the movable portion of the wind turbine, for example on the movable portion of a system for transmitting signals, while the second interface module and the second module for transceiving radiofrequency signals can be intended for an installation on the stationary portion of the wind turbine, for example on the stationary portion of a system for transmitting signals.

Each one of the modules for transceiving can for example comprise an antenna for transceiving radiofrequencies, an analogue-to-digital converter and a digital-to-analogue converter connected to the antenna and to the corresponding interface module.

Advantageously and in a non-limiting manner, the means for processing can be arranged in such a way as to transmit in priority the stream associated with the value of the priority parameter corresponding to the highest degree of priority only when these means for processing are in a first operating mode. The means for processing can be arranged in such a way as to exit this first operating mode and to switch to a second operating mode following the reception of an abolition priority signal.

In other words, the device can give control to another protocol than the one that has been sent until then.

The abolition priority signal can come from a counter, for example from a counter of clock cycles, for a counter of the number of frames transmitted, from a counter of the number of frames put on hold and/or not transmitted etc.

In the second operating mode, the means for processing abstain from transmitting in priority the stream associated with the value of the priority parameter corresponding to the highest degree of priority.

For example, the means for processing carry out a reading of the possible other current values of the priority parameter, and if a stream has effectively been received and placed on hold because it is associated with a priority parameter value corresponding to a lesser degree of priority than another stream, the data corresponding to this stream can then be transmitted.

According to another example, and in particular when the means for processing switch to the second operating mode following the reception of a signal indicating that N frames of such stream have been placed on hold, the device chooses to transmit data of this stream, for example the oldest frame placed on hold, or all of the frames placed on hold.

Advantageously and in a non-limiting manner, the connection means can comprise a plurality of connection elements, with each element corresponding to one wireline. A connection element can for example include a pin, or a bus corresponding to a pin, or other.

Advantageously and in a non-limiting manner, the first interface module comprises a memory for storing:
 a plurality of connection element identifiers, with each identifier corresponding to the connecting element of the plurality of connecting elements,
 a set of at least two distinct values of protocol identifiers.

This memory is arranged so as to associate with at least one, and preferable with each, connection element identifier, a protocol identifier value.

Advantageously, this memory can be reprogrammed, in such a way that the associations between connection element identifiers and protocol identifiers can be reprogrammed.

As such, it can be provided to program the device in such a way that on such a group of pins it is expected to receive data in accordance with such a protocol. In other words, the pins of the device can be allocated to such and such protocol in a flexible manner.

The device can as such be programmed before it is installed in the wind turbine, according to the wired lines and protocols used on this wind turbine. The device can as such be compatible with several types of wind turbines.

This first interface module can for example be incorporated into or include one or several integrated circuits, for example one or several processors, for example a microcontroller, in particular a microcontroller integrating a functionality called PPS ("Peripheral PIN Select"), or other.

Advantageously and in a non-limiting manner, the first interface module can include a programmable logic array, advantageously an FPGA ("Field Programmable Gate Array").

The means for processing can for example include a processor core or CPU ("Central Processing Unit"), logic units, or others.

Advantageously and in a non-limiting manner, the means for processing can be arranged in such a way as to, for at least one group of wireline or wirelines corresponding to a protocol:
 separate the data received into blocks of data, using frame structure parameter values of the protocol associated with this group of wired line(s),
 assign to each block of data a utility parameter value, according to the field parameter value(s) corresponding to this block of data, and
 for each block of data, decide according to the utility parameter value assigned to this block whether or not to retain said block for the purpose of a transmission to the second wireless module for transceiving.

As such the data received is sorted in such a way as to transmit only the useful data, which can make it possible to save even more bandwidth.

The data received can for example be classified as useful or MSG ("message") data and as service information or SI, and abstain from transmitting the service information to the radiofrequency module.

Advantageously and in a non-limiting manner, the means for processing can furthermore be arranged in such a way as to generate a frame of data comprising useful data (at least one block of data retained), with the data frame being structured in such a way as to allow for a later reconstruction of a frame according to the original protocol, i.e. implemented on the group of wired line(s) corresponding to this useful data. The data frame can as such be conformed according to a proprietary protocol.

The data frame can for example comprise, in addition to said at least one block of data retained, a header field comprising at least:
- a connection element identifier, for example a pin identifier, of the second interface module;
- a protocol identifier, in order to identify the protocol of the transmitted stream, and/or
- an identifier of the type of encapsulation of the at least one data block integrated into the data frame corresponding to this header field.

These identifier values can as such make it possible, after reception, to return the useful or MSG data to the destination device, and according to the protocol expected by this destination device. As such, the replacing of an STS system with slip rings with the system described hereinabove can be transparent for the devices already installed on an existing nacelle.

Concerning the identifier of the type of encapsulation, it can be specified that the useful data, i.e. the data block or blocks retained, can indeed include one or several identification fields and a data field or fields. According to the type of encapsulation implemented, it can be provided to retain the identification field(s) of each block of data retained (in particular when the data frame comprises a single block or when the identification field values differ from one block to the other), or to retain only a single identification field for all of the fields of the transmitted data blocks.

Advantageously and in a non-limiting manner, the data frame can comprise a plurality of retained data blocks coming from a plurality of frames received over the wireline group corresponding to this useful data.

As such, it can be provided to group together the data of several original frames in the same frame to be transmitted, which here also can make it possible to limit the bandwidth used.

Advantageously and in a non-limiting manner, the means for processing can furthermore be arranged in such a way as to integrate data to be transmitted, for example the data frame generated, in a frame in accordance with a radiofrequency communications protocol. In other words, the data to be transmitted is encapsulated, for example the data frame generated, in a frame in accordance with a radiofrequency communications protocol implemented by the means for transceiving.

The invention is in no way limited to a given radiofrequency communication protocol. Mention can be made for example of Bluetooth®, Zigbee® and Miwi® or Ultra WideBand (UWB).

In an embodiment, it could be provided to integrate into the same frame in accordance with the radiofrequency communications protocol at least two data frames generated by the means for processing, with these data frames comprising useful data coming from at least two respective groups of wireline(s). As such, the radiofrequency frame obtained could for example comprise several frames of data each having a data field and a header field with an identification bit of the protocol to which the data of the data field conforms.

There is also provided a method for transmitting data between a movable portion and a stationary portion of a wind turbine, implemented on the movable portion or the stationary portion of the wind turbine, and comprising:
- receiving a plurality of data streams, thanks to means for connecting to a plurality of groups of at least one wireline, with each group corresponding to a respective data stream, each stream coming from a corresponding apparatus installed on the mobile portion or on the stationary portion of the wind turbine,
- processing the received streams in such a way as to assign a priority parameter value to each received stream, and in the event of concomitant reception of multiple streams, to compare the values of the priority parameter that are associated with the received streams and transmit by priority to a module for transceiving the radiofrequency signals, for the purpose of a radiofrequency transmission to the other movable portion or the stationary portion of the wind turbine, the stream associated with the value of the priority parameter corresponding to the highest degree of priority.

The method described hereinabove can be implemented by means of digital processing, for example a processor or advantageously an FPGA.

There is also provided a computer program product comprising the instructions in order to carry out the steps of the method described hereinabove when these instructions are executed by an integrated circuit of the processor or programmable logic circuit type. This program can be stored on a memory support, for example a hard drive or other, downloaded from a telecommunications network of the Internet type, or other.

There is also provided a wind turbine comprising a system such as described hereinabove.

The invention shall be better understood in reference to the figures, which show embodiments given as a non-limiting example.

FIG. 1 diagrammatically shows an example of a wind turbine according to an embodiment of the invention.

FIG. 2 shows an example of an STS system according to an embodiment of the invention.

FIG. 3 diagrammatically shows an example of a device according to an embodiment of the invention.

Identical references can designate identical or similar elements, in their form or their function, from one figure to the other.

In reference to FIG. 1, a wind turbine 100 comprises a mast 101, a nacelle 112 and blades 102 attached to a shaft referred to as a slow shaft 103.

A multiplier 104 makes it possible to convert the rotating movement of the slow shaft 103 into a faster movement of a shaft referred to as fast shaft 105.

A generator 115 makes it possible to generate current using the movement of this fast shaft 105.

The wind turbine is provided with sensors, for example sensors of vibration or other, of which only one 109 is shown here for the purposes of clarity. A supervisor 108, comprising for example one or several processors, receives signals coming from these sensors and consequently controls actuators, for example a motor 110 for modifying the orientation of the blades 102.

The devices 109, 110 are as such integral with the blades, while the processor remains stationary.

Cables 116 connected to the sensors or to the actuators are installed inside the slow shaft 103. For increased clarity, only two cables have been shown, but in reality to each device 109, 110, corresponds a group of one or several wires connecting this device to a system for transmitting signals or STS 106.

The STS 106 is located in the vicinity of the multiplier 104 and mechanically coupled to the slow shaft 103. The STS 106 is connected to the supervisor by a group of one or several wirelines, of which a single one 107 is here shown for the purposes of clarity.

Additional cables not shown make it possible to transfer the power between the STS 106 and the motor 110 for orienting blades.

FIG. 2 shows in more detail, but diagrammatically, the system STS of FIG. 1.

The system STS 106 comprises a first interface module 201 mounted on the movable portion of the wind turbine, on the slow shaft side, and comprising a device for transmitting data, for example an integrated circuit of the FPGA type, of which the structure is detailed hereinbelow in reference to FIG. 3. This first interface module 201 is connected to a first module for transceiving radiofrequency signals 301.

This first module for transceiving 301 comprises digital-to-analogue and analogue-to-digital conversion means 302, as well as a radiofrequency antenna 303.

The system 106 further comprises a second interface module 202 and a second module for transceiving radiofrequency signals 401.

This module 401 also comprises an antenna 403 and an analogue-to-digital and digital-to-analogue converter 402.

The convertors 302, 402 are connected on the one hand to the interface modules 201, 202 and on the other hand, to the antennas 303, 403, respectively.

The integrated circuit of the interface module 201 comprises means for connecting, for example pins, for receiving streams coming from several groups of wires. In FIG. 2, only two groups of wires 203, 203' are shown, but more of course could be provided. To each group of wires corresponds a device installed on a blade of the wind turbine, for example a sensor, an actuator or other, and a protocol.

As such, the three wires of the group of wires 203 are used for the data transfer according to a protocol RS232, while the five wires of the group 203' are used for the data transfer according to an Ethernet protocol.

The integrated circuit of the module 201 receives these various streams. When data is received concomitantly on the groups of wires 203 and 203', the integrated circuit of the module 201 assigns to each one of these streams a degree of priority and transfers to the converter 302 with priority the stream of which the value of the priority parameter corresponds to the highest degree of priority. As such, the interface module 201 carries out an arbitrage of the different streams received, which can make it possible to limit the bandwidth used.

In the example of FIG. 2, it is the frame RS232, received on the group of wires 203 that is transmitted with priority, and the Ethernet frame received on the group of wires 303' is stored in a memory of the integrated circuit of the module 201.

Furthermore, the module 201 is able to sort from among the data received the useful data of the service information. In FIG. 2, the fields corresponding to the service information are shown with vertical hashes.

As such, a frame RS232 204 comprises one start bit 205, one data field 206 comprising eight bits, one parity bit 207, and one stop bit 208. The module 201 makes it possible to transmit among these various fields 205, 206, 207, 208, only the field 208 corresponding to the useful data.

In the same way, an Ethernet frame 210 comprises service information 211, 212, 213, and useful or message data 214, 215, 216, 217. More precisely, the service information comprises a preamble portion of seven bytes 211, an SFD ("Start Frame Delimiter") field 212, and an FCS 213 ("Frame Check Sequence") field. The useful data comprises:

a source address field 214 with a length of 6 bytes,
a destination address field 215 also with a length of 6 bytes,
a field of the type and of the size of data transmitted 216 with a length of 2 octets, and finally
a data field 217 with a length able to vary between 46 bytes and 1500 byte.

Here again, the interface module 201 is able to isolate data blocks that correspond to fields 214, 215, 216, 217 of this frame 210. Only the useful data blocks will be retained in a memory of the integrated circuit, with a view to a later transmission, when the RS232 data has been transmitted.

The integrated circuit 201 as such retrieves the useful data blocks, 206, 214, 215, 216, 217 and transmits them to the converter 302. More precisely, the interface module 201 generates a frame of data 222 comprising a header carried out according to a proprietary protocol 220, as well as one or several retained data blocks 221.

More precisely, the header 220 comprises three fields, namely:

A field 223 corresponding to the line number of the protocol sent. In this example, the field occupies a length of three bits, which makes it possible to manage eight wirelines.

A send protocol type field 224. In this example this field occupies three other bits of which the values corresponding to protocol identifiers, for example RS232, RS422, RS485, Bus CAN, Ethernet or other. The second interface module 202 can as such, during the processing of this header 220, know the fields to be retrieved.

A field of the encapsulation type 225, occupying two bits and making it possible to know the type of encapsulation carried out in this data frame 222.

In the example shown the frame transmitted with priority 204 is an RS232 frame, of a relatively simple structure, and the field 221 simply comprises the values of the eight bits of the field 206 of the original frame 204.

However, the data frame 222 can have a more elaborate structure. In particular, the data frame 222 can include several retained blocks of data, for example several fields 206 coming from several successive RS232 frames (or other).

For example, when the radiofrequency signals are generated using Ethernet data, it can be provided to transmit the data of the four fields 214, 215, 216, 217 in the field 221. It can furthermore be provided to add to this field 221 other groups of four fields coming from other Ethernet frames.

Among these four fields 214, 215, 216, 217, the source and destination address fields 214 and 215, can be identical from one Ethernet frame to another. Also, an interesting encapsulation mode can consist in transmitting in the data frame 222 one time the source and destination address values and this, even if the data coming from several Ethernet frames 210 is integrated into a single data frame 222.

Of course, the invention is not limited to a particular type of encapsulation. It can be provided to repeat in the same data frame 222 these address and destination values, even if they are identical.

In the case not shown of a bus CAN, the useful data comprises a variable number of fields according to the type of frame (data query). More precisely, each frame comprises an identification field of 11 bits for the standard CAN Bus 2.0A and 29 bits for the standard 2.0B and a field of the 1-bit frame type. If the value of this latter type bit is 0, i.e. the frame is a frame of data, then the frame further comprises two additional fields, namely a field with a transmitted data size of 4 bits, and a data field properly speaking, of which the size, indicated by the value of the size field, is able to vary between 0 and 8 bytes. The data frame generated by the interface module 201 can as such integrate between two and four fields for each CAN frame, according to whether the original CAN frame is a query or data field. When the data coming from several frames CAN is grouped together into a single data frame, it can for example be provided, according to the type of encapsulation implemented, to transmit a single time the identification field, then for each frame a single field (case of a query source frame) or three fields (case of a data source frame).

The interface module 221 is furthermore arranged to integrate the data frame 222 in a frame 226 in accordance with a radiofrequency communications protocol implemented between the antennas 303 and 403, for example a Bluetooth® communications protocol. As such, the frame 226 can furthermore comprise Bluetooth® fields or others 227, 228, of the type implemented in Bluetooth® communications or others.

At reception, the second interface module 202, is arranged to process these fields 227, 228 and for processing the fields 223, 224, 225 of the header 220. The data 221 are as such transferred to the group of wires corresponding to the pin numbers indicated in the field 223, after re-encapsulation according to the type of protocol indicated in the field 224.

In this example a single group of wires 230 is shown on the stationary portion side of the nacelle, and a field 506 comprising eight bits corresponding to the eight bits of the field 206 of the RS232 frame 204 is transmitted, after encapsulation in a RS232 frame 504 further comprising fields 505, 507 and 508 in accordance with the protocol RS232. The field 505 as such corresponds to one start bit, the field 507 to one parity bit, and the field 508 to one stop bit.

The destination device, for example the supervisor, can therefore receive this frame 504, of the same type as the frame 204 and transporting the same useful data.

As such, the replacing of an STS system with slip ring with this STS system 106 can be carried out without replacing or reprogramming devices on the stationary portion side and on the movable portion side.

In reference to FIG. 3, an integrated circuit 601 is integrated into the interface module referenced as 201 in FIG. 2. This integrated circuit comprises pins 602 of which one group of pins 603 intended to receive data according to the protocol RS232 and a group of pins 603' intended to receive Ethernet data. It is understood that the pins 603 are intended to be connected to the wires of the group 203, while the pins 603' are intended to be connected to the groups of wires 203'.

The integrated circuit 601 further comprises means for processing 604 for assigning a degree of priority to each stream, as well as two memories 605 and 606.

The memory 605 stores the pin identifiers and the protocol identifiers. This memory 605 is structured in such a way that to each pin is associated a protocol identifier. This memory 605 can be reprogrammed, i.e. such and such pin is dynamically allocated to such and such protocol. This memory 605 is furthermore structured in such a way as to associate with each protocol a corresponding priority parameter value, or degree of priority. For example, data received according to a protocol CAN will be considered as with priority compared to the data received according to an Ethernet protocol.

The memory 606 is used to temporarily store the streams received but considered as non-priority.

In this embodiment, each time that a received stream is stored temporarily in the memory because another stream, considered as with priority is transmitted via pins 607 to the supervisor, a counter is incremented. When the counter reaches a threshold, with this threshold being variable according to the type of protocol associated with the stream to be retained in the memory 606, an abolition priority signal is generated and the means for processing 604, switch to another operating mode, wherein the transmission of the stream is imposed until then considered as non-priority.

The means for processing 604, are furthermore arranged to sort the data received from the various streams into service information and into useful data. Each block of useful data is transmitted, while the service information is erased.

The transmission of this useful data is carried out via a proprietary protocol, i.e. that in this example, data frames are generated by concatenating one or several useful blocks of data, and a header field intended to be processed by an integrated circuit of the same type as the integrated circuit 601, and integrated into the second interface module, referenced as 202 in FIG. 2.

The means for processing 604 are furthermore arranged to generate frames according to a radiofrequency communications protocol, i.e. each frame of useful data is encapsulated for example in starting and/or ending fields, in accordance with the radiofrequency communication protocol implemented in the STS system referenced as 106 in FIGS. 1 and 2.

It is understood that the integrated circuit 601 is furthermore arranged to process the data coming from the group or groups of wires located on the antenna side in accordance with the radiofrequency communications protocol implemented, and in accordance with the data figurant in the headers of the type 220 received.

The second interface module 202 can as such integrate an integrated circuit not shown and similar in its structure and its operation to the integrated circuit referenced as 601 in FIG. 3.

The integrated circuit referenced as 601 is in this example an FPGA.

The invention claimed is:

1. Device for transmitting data (601) between a movable portion and a stationary portion of a wind turbine, intended to be installed on the movable portion or the stationary portion of the wind turbine, and comprising:
   means for connecting (603, 603') to a plurality of groups of at least one wireline, in order to receive a plurality of respective data streams, each stream coming from a corresponding apparatus installed on the mobile portion or on the stationary portion of the wind turbine,
   means for processing (604) received streams, configured to assign a priority parameter value to each received stream, and in the event of concomitant reception of multiple streams, to compare the values of the priority parameter that are associated with the received streams and transmit by priority to a module for transceiving the radiofrequency signals, for the purpose of a radiofrequency transmission to the other movable portion or the stationary portion of the wind turbine, the stream associated with the value of the priority parameter corresponding to the highest degree of priority.

2. The device (601) according to claim 1, said device being arranged in such a way that for at least one stream, the priority parameter value assigned to this stream are according to an identifier value of the communication protocol corresponding to said stream.

3. The device (601) according to claim 2, wherein the means for processing are arranged in such a way as to transmit with priority the stream associated with the value of the priority parameter corresponding to the highest degree of priority only when said means for processing are in a first operating mode, and wherein
the means for processing are arranged in such a way as to exit from this first operating mode and to switch to a second operating mode following the reception of an abolition priority signal.

4. The device (601) according to claim 2, wherein
the connection means include a plurality of connection elements (603, 603'), with each element corresponding to one wireline, and
the device comprises a reprogrammable memory (605) for storing a plurality of connection element identifiers, with each identifier corresponding to the connecting element of the plurality of connecting elements, and a set of at least two distinct values of protocol identifiers, with this memory being arranged in such a way as to associate with at least one connection element identifier a protocol identifier value.

5. The device (601) according to claim 2, wherein the means for processing are arranged in such a way as to, for at least one group of at least one wireline, sort the data received into service information and into useful data, and in such a way as to abstain from transmitting the data identified as service information to the module for transceiving radiofrequency signals.

6. The device (601) according to claim 1, wherein the means for processing are arranged in such a way as to transmit with priority the stream associated with the value of the priority parameter corresponding to the highest degree of priority only when said means for processing are in a first operating mode, and wherein
the means for processing are arranged in such a way as to exit from this first operating mode and to switch to a second operating mode following the reception of an abolition priority signal.

7. The device (601) according to claim 6, wherein
the connection means include a plurality of connection elements (603, 603'), with each element corresponding to one wireline, and
the device comprises a reprogrammable memory (605) for storing a plurality of connection element identifiers, with each identifier corresponding to the connecting element of the plurality of connecting elements, and a set of at least two distinct values of protocol identifiers, with this memory being arranged in such a way as to associate with at least one connection element identifier a protocol identifier value.

8. The device (601) according to claim 6, wherein the means for processing are arranged in such a way as to, for at least one group of at least one wireline, sort the data received into service information and into useful data, and in such a way as to abstain from transmitting the data identified as service information to the module for transceiving radiofrequency signals.

9. The device (601) according to claim 1, wherein
the connection means include a plurality of connection elements (603, 603'), with each element corresponding to one wireline, and
the device comprises a reprogrammable memory (605) for storing a plurality of connection element identifiers, with each identifier corresponding to the connecting element of the plurality of connecting elements, and a set of at least two distinct values of protocol identifiers, with this memory being arranged in such a way as to associate with at least one connection element identifier a protocol identifier value.

10. The device (601) according to claim 9, wherein the means for processing are arranged in such a way as to, for at least one group of at least one wireline, sort the data received into service information and into useful data, and in such a way as to abstain from transmitting the data identified as service information to the module for transceiving radiofrequency signals.

11. The device (601) according to claim 1, wherein the means for processing are arranged in such a way as to, for at least one group of at least one wireline, sort the data received into service information and into useful data, and in such a way as to abstain from transmitting the data identified as service information to the module for transceiving radiofrequency signals.

12. The device (601) according to claim 11, wherein the means for processing are arranged in such a way as to generate a frame of data comprising useful data and structured in such a way as to allow for a later reconstruction of a frame according to a protocol implemented over the group of least one wireline corresponding to said useful data.

13. The device according to claim 12, wherein the means for processing are arranged in such a way as to generate a frame in accordance with a radiofrequency communications protocol and comprising the data frame.

14. System for transmitting data (106) between a movable portion and a stationary portion of a wind turbine, comprising:
a first interface module (201) intended to be installed on the movable portion or the stationary portion of the wind turbine, and comprising the device according to claim 1,
a first module for transceiving radiofrequency signals (301), connected to the first interface module, in order to emit radiofrequency signals using signals received from the first interface module,
a second module for transceiving radiofrequency signals (401), intended to be installed on the other of the movable portion or the stationary portion of the wind turbine, for receiving the radiofrequency signals emitted by the first module for transceiving, and
a second interface module (202), connected to the second module for transceiving, comprising connection means for transmitting data coming from the second module for wireless over at least one group of at least one wireline (230), to at least one device installed on the other mobile portion or on the stationary portion of the wind turbine.

15. Wind turbine (100) comprising the system for transmitting (106) according to claim 14.

16. Method for transmitting data between a movable portion and a stationary portion of a wind turbine, implemented on the movable portion or the stationary portion of the wind turbine, and comprising:
receiving a plurality of data streams, thanks to means for connecting to a plurality of groups of at least one wireline, with each group corresponding to a respective data stream, each stream coming from a corresponding apparatus installed on the mobile portion or on the stationary portion of the wind turbine,
processing the received streams in such a way as to assign a priority parameter value to each received stream, and in the event of concomitant reception of multiple streams, to compare the values of the priority parameter that are associated with the received streams and transmit by priority to a module for transceiving the radiofrequency signals, for the purpose of a radiofrequency transmission to the other movable portion or the stationary portion of the wind turbine, the stream associated with the value of the priority parameter corresponding to the highest degree of priority.

\* \* \* \* \*